(No Model.) 2 Sheets—Sheet 1.
C. DE QUILLFELDT.
TRAP SHOOTING DEVICE.
No. 466,257. Patented Dec. 29, 1891.
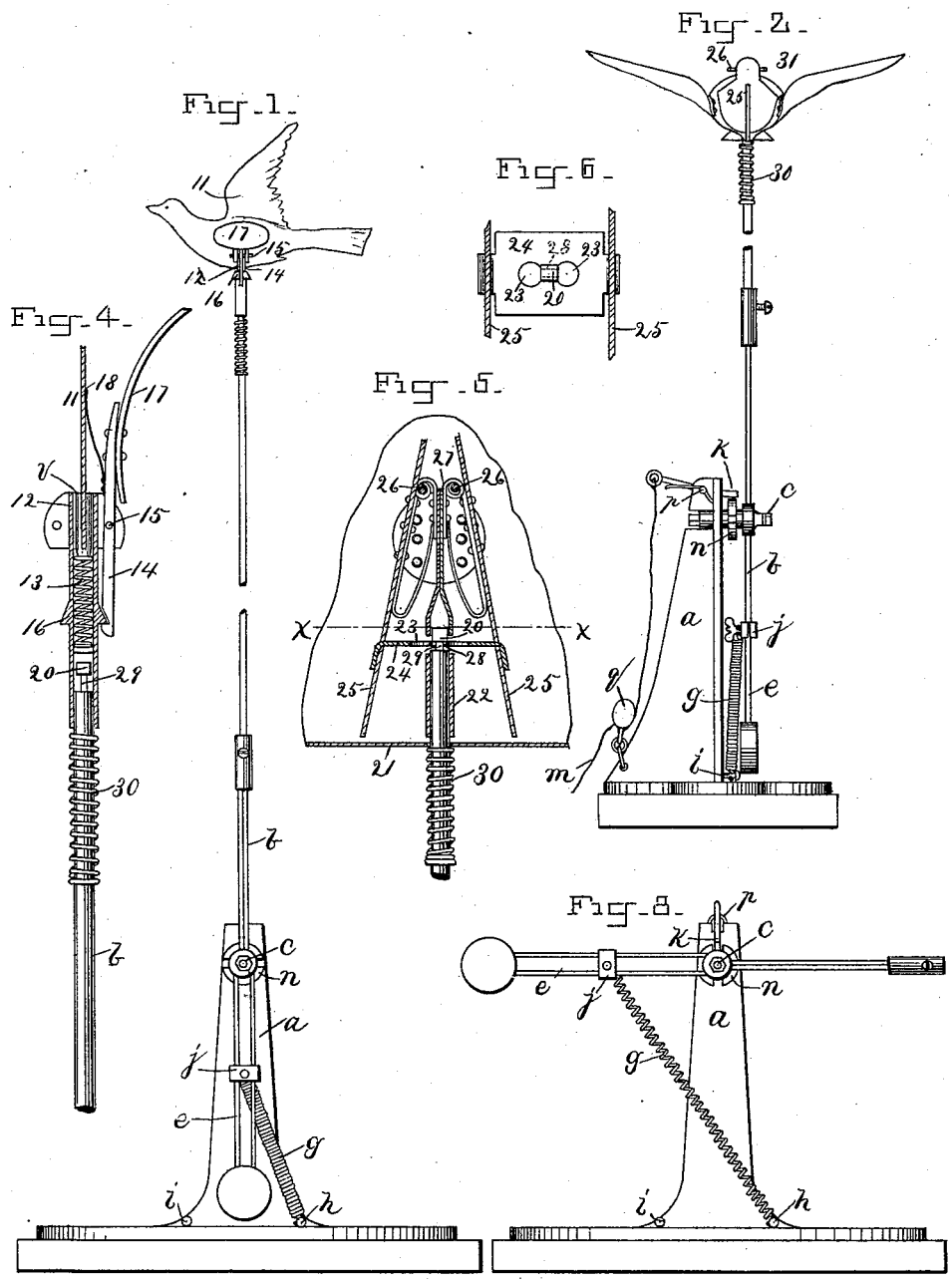
WITNESSES:
C. E. Whitney
D. J. Morgan
INVENTOR:
Chas. de Quillfeldt
By A. P. Thayer
atty (No Model.) 2 Sheets—Sheet 2.
C. DE QUILLFELDT.
TRAP SHOOTING DEVICE.
No. 466,257. Patented Dec. 29, 1891.
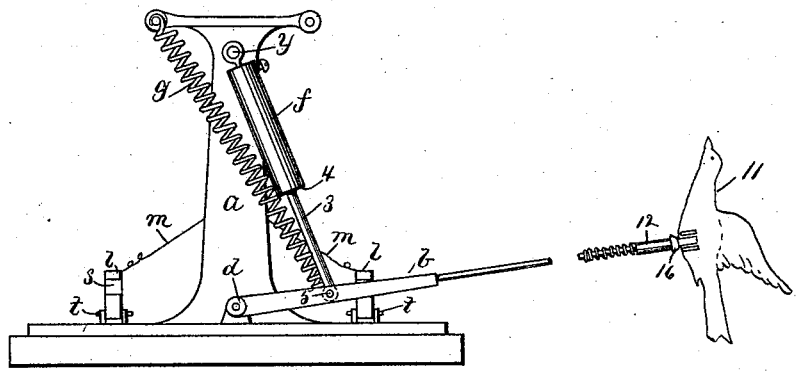
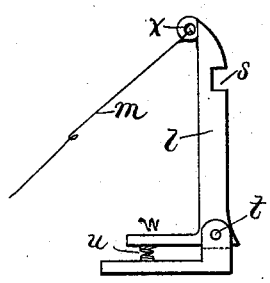
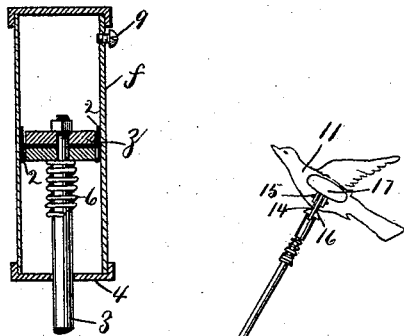
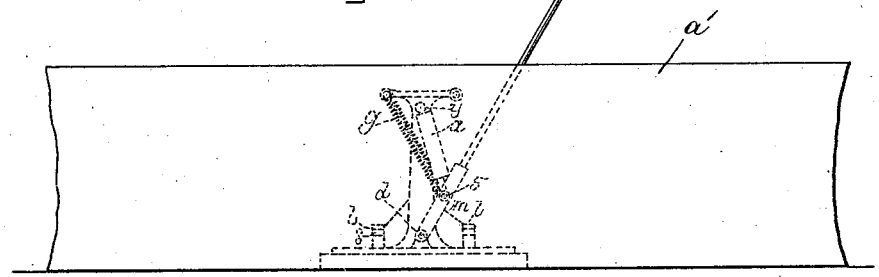
WITNESSES: INVENTOR:

UNITED STATES PATENT OFFICE.

CHARLES DE QUILLFELDT, OF AMITYVILLE, NEW YORK.

TRAP SHOOTING DEVICE.

SPECIFICATION forming part of Letters Patent No. 466,257, dated December 29, 1891.

Application filed June 19, 1891. Serial No. 396,867. (No model.)

*To all whom it may concern:*

Be it known that I, CHARLES DE QUILLFELDT, a citizen of the United States, and a resident of Amityville, in the county of Suffolk and State of New York, have invented certain new and useful Improvements in Trap Shooting Apparatus, of which the following is a specification.

My invention consists in improved apparatus comprising dummy-birds, means for moving them in a short flight through the air as if natural birds rising from a trap, and means for automatically throwing the birds from the moving staff and dropping them on the ground as dead birds when and by the effect of being hit in a part corresponding to a vital part in a live bird, all as hereinafter fully described, reference being made to the accompanying drawings, in which—

Figure 1 is an elevation of the apparatus as in the act of causing the flight of the bird in side view to an observer. Fig. 2 is an elevation of the apparatus as in the flight of an "incoming" bird—that is, one flying toward the observer. The apparatus is also seen in the same view when the bird is moved as a "driver" or from the observer, the bird being reversed and the staff being moved in the reverse direction. Fig. 3 is a side elevation of apparatus for setting, tripping, and swinging the bird-carrying staff, part only of the latter being shown. Fig. 4 is a vertical transverse section of the apparatus for thrusting off the so-called "killed" bird, passing in side view on an enlarged scale. Fig. 5 is a vertical transverse section of the apparatus for thrusting off the killed "incomer" or driver, also on an enlarged scale. Fig. 6 is a horizontal section of the apparatus of Fig. 5 on line $x\,x$. Fig. 7 is a side elevation of the apparatus for setting, tripping, and swinging the bird-carrying staff, showing a modified arrangement of some of the apparatus and an auxiliary staff-actuating device. Fig. 8 is a sectional elevation of the air-spring of the auxiliary staff-actuating device. Fig. 9 is a side elevation of a holding-catch employed in the modified arrangement of Fig. 7 on an enlarged scale. Fig. 10 is a section of the vent-plug of the air-spring enlarged; and Fig. 11 is an elevation of the complete apparatus, including a screen for concealing the same, so that the bird will not be seen by the one who shoots until started on its flight.

On any approved stand $a$ I pivot a bird-carrying staff $b$, as at $c$, Figs. 1, 2, and 3, or as at $d$, Figs. 7 and 11, so as to swing freely from behind a screen $a'$ and preferably from a horizontal position at one side of said stand to a similar position at the outer side either way, said staff having in the former case a counterbalancing-arm $e$, extending downward from the pivot, but in the latter case having the pivot at its lower end and provided with an air-spring device as a substitute for the counter-balance. The staff is made in suitable length for swinging a driving bird attached to the end of the long arm to a height giving the sportsman a fair shot, and is provided with a strong spring $g$ for so swinging it, said spring being attached at one end to the stand and at the other end to the staff in any approved way or arrangement for effecting the purpose in Figs. 1, 2, and 3. It is connected to the weighted arm $e$ and to stud $h$ at the right hand of the axis of the arm for swinging the staff from right to left and to stud $i$ at the left hand of the axis for swinging the staff in the reverse direction, the connection being readily detachable, as by a hook, for allowing the change to be readily made, and it is connected to the arm $e$ by a clamp $j$, that is adjustable along said arm for varying the leverage of the spring for lighter or heavier birds and for varying the speed of the flight. The end of the spring connected to the arm of the staff swings across the vertical plane of the axis of the arm when the staff crosses said plane under the impetus imparted to it in the first part of the action of the spring which then reaches the limit of its contraction, and during the rest of the movement of the staff the spring pulls on the arm $e$ and gradually retards the motion of the staff, so as to stop it gently about when it reaches the horizontal position again, or when the bird strikes the ground in case it is not shot off.

There is a holding and tripping latch $k$ or $l$ to engage and hold the staff in the set position, Fig. 3, until word is given that the man who shoots is ready, when the latch is tripped by the attendant with a line $m$. In Figs. 1, 2, and 3 the staff has a hub $n$, in which the latch $k$ engages to hold it, said latch being pivoted at $p$ in the top of the standard and having the cord attached to the outer end, said cord extending through the guide-pulley $q$ and thence to the place where the attendant stands.

In Fig. 7 there are two latches $l$, one of which is used when the staff is set to the right-hand and the other when it is set to the left. They are set upright on the pivots $t$ and hook onto the staff or a stud projecting from its side by the notch $s$, and have a spring $u$ under the the short arm $w$ to maintain the connection with the staff until tripped. The cord $m$ has in this case a branch to each latch connected in the eye $x$ for tripping the staff.

The air-spring to be used as auxiliary to the coiled spring and for controlling and checking the movements of the staff when the counterbalance device of Figs. 1, 2, and 3 is not employed consists of the hollow cylinder $f$, pivoted to the stand $a$ at $y$ and containing the piston $z$, having the usual cup-packing 2, the rod 3 extending out through the head 4 of the free end of the cylinder and connected by a pivot-joint 5 with the staff $b$, and between the piston and said head there is a short buffer-spring 6, that comes into action against said head just before the staff comes to the end of its range for powerfully re-enforcing the retarding action of the piston and the spring $g$ to stop the staff gently when it goes down with the bird. Said spring also aids spring $g$ powerfully in starting the staff when tripped. The air-spring is a retarder also on the upstroke to prevent the spring $g$ from thrusting the staff too quickly. Its action is graduated by the vent at the upper end of the cylinder controlled by the vent-plug 9, which, being screwed in and out of the shell of the cylinder, opens or closes the passage 10 more or less, as required, to limit the inlet of air on the downstroke and cause a partial vacuum to act together with the buffer-spring to stop the staff, and on the upstroke the plug limits the exit of the air, and when the staff passes over its pivot-center checks the staff a little before it begins its descent on the other side. The air-spring is also adapted to be used alone to actuate the staff independently of the coiled spring.

For mounting the birds on the staff so as to be released by the effect of shot striking them, various contrivances may be employed. For example, the bird 11 for passing in side view has a small short vertical stud $r$ projecting from under the middle of the body suitably to enter a socket 12 on the top of the staff containing a coiled spring 13, to be compressed by said stud when inserted in the socket, and from the side of the body a catch-hook 14, pivoted at 15, extends downward a suitable distance to catch on a collar 16 or other suitably-projecting device on the exterior of the socket when said stud is fully entered in the socket. Above the pivot of the catch-hook a thin metal plate 17, which I call a "tripping-plate," is attached, so as to be in side view of the one who shoots, the area of which plate is equal to that of the vital portions of the body of a bird, so that it will be struck when the aim is such that a vital part of a bird would be hit, and will be forced back by the shot and will disconnect the catch 14 from the collar 16 and release the spring, which will throw the bird off to fall on the ground in about the same action as a live bird is projected by its momentum prior to its fall when fatally hit. There is a light spring 18 behind plate 17 to prevent the accidental escape of the catch 14 until struck by the shot.

I have only represented the catch and tripping-plate on one side of the bird; but each side may of course be furnished alike, so that the bird may be shot off in the movement of the staff in either direction; but it may also be shot off by being hit on the side not having the tripping-plate by the thrust of the bird in the direction of the plate caused by the impact of the shot, when the inertia of the plate will cause the catch to be disconnected; but in such case the whole area of the bird exposed to the shot would be effective for releasing the catch.

While the above-described apparatus may be employed with good results for releasing and throwing off incoming or driving birds 31, I have represented another form of apparatus for these cases, in which a head 20 of the upper end of the staff, the socket 12 being detached, is inserted through a hole in the under side plate 21 of the bird, up through a steadying-tube 22, and through one or the other of the holes 23 in a catch-plate 24, carried on the tripping-plates 25, pivoted at 26 on a fixed support 27, so as to be shifted one way or the other, according as one or the other is struck by the shot, said catch-plate having a narrow slit 28, (dotted, Fig. 6,) in which the neck 29 of the staff is set when the bird is applied, so that the head holds the bird on the staff against the throwing-off spring 30, which is compressed when the bird is put on the staff ready for throwing it off when tripped, which is effected by the tripping-plates, which shift the catch-plate one way or the other, according as one or the other is struck by the shot, so that one or the other of the holes 23 is brought under the head of the staff, permitting the catch-plate to escape and the bird to be thrown off. This latter form of apparatus for applying the bird to the staff and for tripping it may also be used in lieu of the other first described for the bird passing in side view. It will be seen that the staff is fitted for both these forms of fastening and tripping devices, the head 20 and the spring 30 being adapted for the devices of Figs. 2, 5, and 6, the spring being attached to the staff sufficiently below the upper end to permit the spring-holding socket 12 of Figs.

1, 2, 4, 7, and 11 to be placed on the staff above it, said spring being compressed to make room for the socket.

It is obvious that the arrangement of the spring for throwing off the bird may be modified in various ways—as, for instance, it may be located in the bird so as to be detached along with the bird from the staff.

Instead of the arrangement of the staff and its pivot for swinging the staff in a vertical plane, they may be such that the bird will swing in a horizontal or an inclined plane.

I claim—

1. In a trap shooting apparatus, the combination of an automatic bird-moving staff, an automaton bird detachably attached thereto, an automatic bird-detaching device, and a tripping-plate for releasing the detaching device by the impulse of the shot hitting it, substantially as described.

2. In a trap shooting apparatus, the combination of the automatic bird-moving staff, an automaton bird detachably attached thereto, a screen concealing the bird in the start, an automatic bird-detaching device, and a tripping-plate for releasing the detaching device by the impulse of the shot hitting it, substantially as described.

3. In a trap shooting apparatus, the combination of the automatic bird-moving staff, an automaton bird detachably attached thereto, a catch holding the bird on the staff, a tripping-plate attached to the catch and exposed to be struck by the shot, and a spring to throw the bird off from the staff when released by the tripping-plate, substantially as described.

4. In a trap shooting apparatus, the combination of the pivoted automatic bird-moving staff, an automaton bird detachably attached thereto, a spring actuating the staff, and a setting and tripping latch and cord, said actuating spring arranged to cross the middle plane of the range of the staff and retard the staff in the latter part of its movement, substantially as described.

5. In a trap shooting apparatus, the combination of the pivoted automatic bird-moving staff, an automaton bird detachably attached thereto, a spring actuating the staff, a setting and tripping latch and cord, said actuating-spring arranged to cross the middle plane of the range of the staff in the latter part of its movement, and an auxiliary retarder, substantially as described.

6. In a trap shooting apparatus, the combination of the pivoted automatic bird-moving staff, an automaton bird detachably attached thereto, a coiled spring and an auxiliary pneumatic spring actuating the staff, and a setting and tripping latch and cord, substantially as described.

7. In a trap shooting apparatus, the combination of the pivoted automatic bird-moving staff, an automaton bird detachably attached thereto, a spring actuating the staff, a setting and tripping latch and cord, said actuating-spring arranged to cross the middle plane of the range of the staff and retard the staff in the latter part of its movement, and a pneumatic auxiliary retarder, substantially as described.

8. In a trap shooting apparatus, the combination of the pivoted automatic bird-moving staff, an automaton bird detachably attached thereto, a coiled spring and an auxiliary pneumatic spring actuating the staff, and a setting and tripping latch and cord, said spring arranged to cross the middle plane of the range of the staff and retard the staff in the latter part of its movement, substantially as described.

9. In a trap shooting apparatus, the combination of the pivoted automatic bird-moving staff, an automaton bird detachably attached thereto, a coiled spring and an auxiliary pneumatic spring actuating the staff, a setting and tripping latch and cord, said springs arranged to cross the middle plane of the range of the staff and retard the staff in the latter part of its movement, and the coiled buffer-spring in the pneumatic spring, substantially as described.

10. In a trap shooting apparatus, the combination of the pivoted automatic bird-moving staff, an automaton bird detachably attached thereto, and an actuating-spring for the staff, crossing the middle plane of the range of the staff and reversible to a hitching-point either side of said middle plane for actuating the staff in either direction, substantially as described.

Signed at New York city, in the county of New York and State of New York, this 26th day of May, A. D. 1891.

CHARLES DE QUILLFELDT.

Witnesses:
W. B. EARLL,
W. J. MORGAN.